United States Patent Office 3,095,290
Patented June 25, 1963

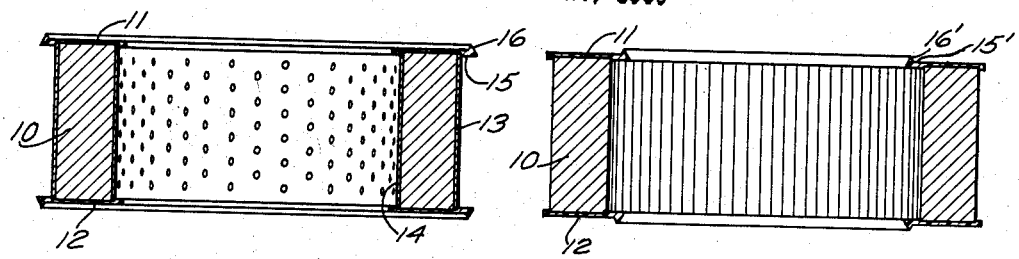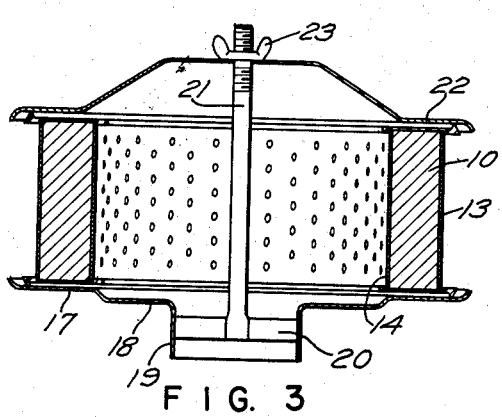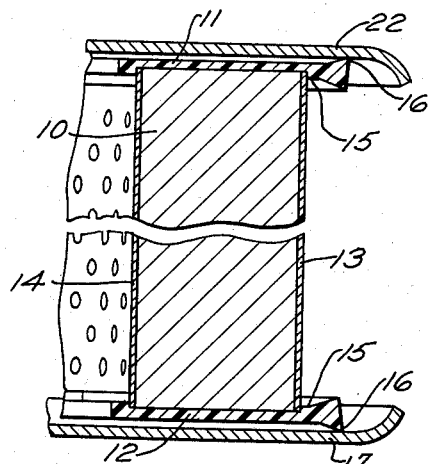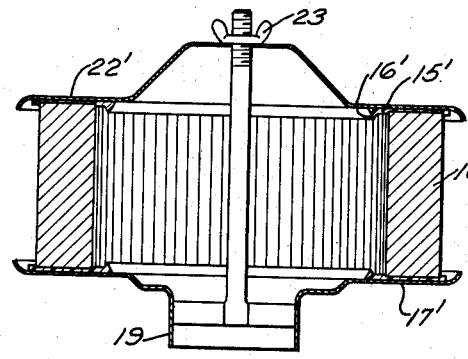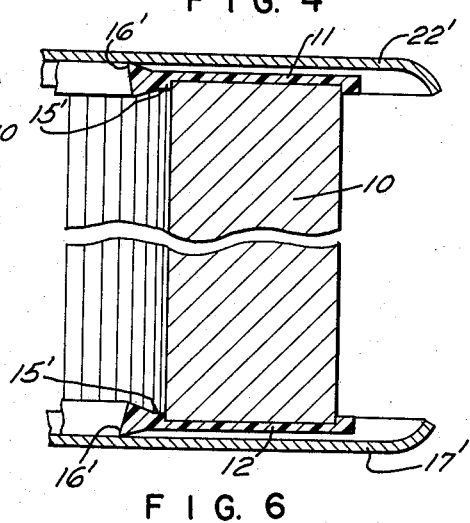

3,095,290
END SEALING MEANS FOR FILTER CARTRIDGES
Carl G. Hockett, Uxbridge, Mass., assignor to Fram Corporation, Providence, R.I., a corporation of Rhode Island
Filed Oct. 26, 1960, Ser. No. 65,212
2 Claims. (Cl. 55—502)

This invention relates to novel sealing means at the ends of a filter cartridge to prevent leakage between such ends and the parts of a container that engage such ends. This application is a continuation-in-part of U.S. application Serial No. 10,647, filed February 24, 1960, now abandoned.

The invention pertains primarily to tubular filter cartridges in which the filter element is formed of pleated paper, and has a sealing end cap at each end of the pleated element.

The filter cartridge of the present invention was designed primarily for use as an air filter but may be used to filter oil or other fluids.

Pleated paper filter cartridges have been provided heretofore with molded plastic end caps having one or more sealing ribs or gaskets projecting from the outer face of the end caps so that these gaskets will form a seal between the ends of the cartridge and parts of the housing engaged by these gaskets.

Such prior constructions work very well in many cases, but these pleated paper cartridges are not particularly strong and if a relatively high clamping pressure is exerted on the cartridge to force such gaskets into tight sealing engagement with parts of the housing, the cartridge may be injured by such excessive pressure. The difficulty in obtaining a tight seal is caused primarily by distortion in and variations in the tolerance of the parts forming the metal housing for the cartridge.

The present invention contemplates a novel seal for one or both ends of the filter cartridge. Such seal is secured by providing one or both ends of the cartridge with a flexible plastic end cap having a protruding annular flange that will flex a substantial amount under pressure. This flange has an annular rib or gasket extending from a face thereof near its outer periphery. The construction is such that the flange will both flex and bend and the gasket will move bodily and bend under pressure to conform to a contacting surface and seal thereagainst before any material compression of the gasket occurs. The sealing is secured with the exertion of only a minimum pressure on the pleated filter cartridge.

These features of the present invention will be further understood from the following description when read in connection with the accompanying drawing, wherein;

FIG. 1 is a vertical sectional view through a filter cartridge having the sealing means of the present invention.

FIG. 2 is a similar view showing the sealing gasket at the inside of the annulus rather than at the outside as in FIG. 1.

FIG. 3 is a vertical sectional view through the cartridge of FIG. 1 mounted in a housing, but not under sealing pressure.

FIG. 4 is an enlarged view of parts of FIG. 3 with sealing pressure applied.

FIG. 5 is the same as FIG. 3, except that the sealing gasket is at the inside of the annulus; and FIG. 6 is an enlarged view of part of FIG. 5 showing sealing pressure applied.

The pleated filter cartridge may be given various shapes and sizes but preferably has the general shape of a tube or annulus as shown in the drawing.

As shown in FIG. 1, the filter cartridge comprises the ring shaped pleated filter element 10 preferably formed of porous paper that is treated with resin to stiffen the paper and keep it from becoming limp in the presence of water. This annular filter element 10 has a plastic upper end cap 11 and plastic lower end cap 12, and the pleated element is here shown as protected by a perforated metal outer wall 13 and a similar inner wall 14. The present means of sealing, however, is particularly advantageous when the metal walls 13 and 14 are omitted, and the pleated paper alone must stand the sealing pressure. Each end cap is formed of resilient rubber-like plastic material, such as plastisol molded to shape. The end caps 11 and 12 each has an outwardly projecting annular flange 15 provided with an annular rib or gasket 16.

The filter cartridge of FIG. 2 is the same as that of FIG. 1, except the perforated tubes 13 and 14 are not shown, and the protruding flange 15' and annular gasket 16' are at the inside of the filter annulus.

FIG. 3 shows the filter cartridge of FIG. 1 placed in a filter housing of the type that may be connected to the carburetor of a motor vehicle to supply filtered air to the carburetor and engine. Such housing, as shown, comprises an annular lower wall 17 having the depressed part 18 and downwardly extending neck 19 for attachment to a carburetor. Within the neck 19 is secured a bridge bar 20 to which is secured the upwardly extending threaded post 21. After the cartridge is placed upon the lower wall or floor 17, it is held in place by the annular cover 22 having a central hole to receive the upper end of the post 21, and the cover is held in place resting upon the cartridge by the thumb-nut 23.

It will be noted that in FIG. 3 the filter is supported in spaced relation to the floor 17 by the lower gasket 16, and that the cover 22 is held in spaced relation to the cartridge by the upper gasket 16. When the clamping pressure is increased in FIG. 3 by tightening the thumbnut 23, the protruding outer flanges 15 are deflected as shown in FIG. 4 and the gaskets 16 seal on the surfaces 17 and 22, but as shown there is still some clearance between the ends of the cartridge and the housing surfaces 17, 22.

By employing the construction just described, the cover 22 may be forced downwardly from its position of FIG. 3 to its sealing position of FIG. 4 an amount equal to the distance the gasket 16 normally projects upwardly from the face of the end cap 11, without exerting an injurious pressure on the pleated cartridge. Therefore, if either metal surface 17 or 22 is distorted or dented, an air-tight seal can still be secured without exerting an injurious pressure on the cartridge. This is due to the construction whereby advantage is taken of the flexing and bending of the annular flanges 15. In order to secure these advantages, it is important that the gasket 16 be disposed outwardly a substantial distance beyond the outer metal wall 13 and pleats 10, so that this projecting flange 15 is free to flex as shown in FIG. 4.

In FIG. 5 the filter cartridge of FIG. 2 is shown in a metal housing similar to the housing of FIG. 3, so that the annular gaskets 16' engage the base plate 17' and cover 22'. When pressure is applied to the cartridge of FIG. 5 by tightening the thumb-nut, the inwardly projecting flanges 15' will be flexed as shown. As a result of this flexing of the flange and bending of the flange and gasket, a tight seal will be secured even if the metal base and cover are distorted, bent or dented, and this seal is secured without exerting an injurious pressure on the cartridge.

It will be noted that the flexible end caps 11 and 12 each have only one annular sealing gasket. This is important as the sealing pressure causes the flange 15 and gasket 16 to bend under pressure where needed and permits the gasket to move bodily and seal against a contacting surface. As a result of this construction the sealing gasket will continue to bend under pressure to conform to an irregular surface until the plastic end cap 11 or 12 contacts the adjacent surface 17 or 22. At no time is any substantial pressure exerted on the sealing gasket. If the distance which the gasket projects beyond the flat face of the end cap is greater than the maximum irregularities of such face against which the end cap is to seal, complete sealing will take place with a minimum amount of applied pressure.

By employing the projecting annular flange of the present invention, the integral sealing gasket at the outer periphery of this flange can move bodily and bend to conform to irregularities in the adjacent surface under a minimum pressure. It is this ready bending of the gasket that produces the tight seal.

It will be seen from the foregoing that the construction of the present invention is well adapted to secure sealing on irregular surfaces while exerting a minimum sealing pressure on the pleated filter, and that the bending and flexing of the protruding annular flanges will permit the annular gasket to bend and form a tight seal before the flat face of the end caps 11 and 12 are engaged by the end walls 17, 22.

In prior constructions where the plastic end cap of a filter cartridge was provided with a protruding sealing gasket, the compression of such gasket was relied upon to effect the seal. In contrast with such prior constructions, the bodily movement of the present flange and the bending of the flange are relied upon to provide a tight seal upon the exertion of only a slight sealing pressure.

Having thus described my invention, what I claim and desire to patent by Letters Patent is:

1. A filter cartridge constructed to compensate for distortions in and manufacturing variations in the top filter engaging wall or bottom filter engaging wall of a housing for such cartridge, comprising a tubular pleated filter medium having a closure cap secured to each end thereof, at least one of said caps being formed of a resilient rubber-like plastic molded to shape and having a single annular flange that projects laterally well beyond the circle defined by the folds of the pleats, and having an integral annular gasket projecting from the outer face of such flange and positioned so that the entire gasket lies some distance from said circle to engage a wall of such housing, so that when pressure is applied the projecting flange can flex and bend to permit the gasket in its entirety to move bodily and bend to secure a seal against said wall under a minimum end pressure upon the cartridge.

2. A filter cartridge constructed to compensate for distortions in and manufacturing variations in the top filter engaging wall and bottom filter engaging wall of a housing for such cartridge, comprising a tubular pleated filter medium having a closure cap secured to each end thereof, both caps being formed of a resilient rubber-like plastic molded to shape and each having a single annular flange that projects laterally well beyond the circle defined by the folds of the pleats, and each having an integral annular gasket projecting from an outer face of its flange and positioned so that the entire gasket lies some distance from said circle to engage a wall of such housing, so that when pressure is applied the projecting flange can flex and bend to permit the gasket in its entirety to move bodily and bend to secure a seal against said walls under a minimum end pressure upon the cartridge.

References Cited in the file of this patent

UNITED STATES PATENTS

| | | |
|---|---|---|
| 2,732,031 | Rabbitt et al. | Jan. 24, 1956 |
| 2,771,156 | Kasten et al. | Nov. 20, 1956 |
| 2,871,976 | Sebok | Feb. 3, 1959 |
| 2,988,170 | Pritchard | June 13, 1961 |

FOREIGN PATENTS

| | | |
|---|---|---|
| 491,730 | Italy | Mar. 11, 1954 |